United States Patent
Danna et al.

(10) Patent No.: US 12,014,126 B2
(45) Date of Patent: Jun. 18, 2024

(54) GENERATING ACCURATE AND DIVERSE SIMULATIONS FOR EVALUATION OF AUTONOMOUS-DRIVING SYSTEMS

(71) Applicant: Woven by Toyota, U.S., Inc., Palo Alto, CA (US)

(72) Inventors: Emilie Jeanne Anne Danna, Sunnyvale, CA (US); David Andrew Dolben, San Francisco, CA (US); Erik Newell Gaasedelen, San Francisco, CA (US); Muhammad Usman, Sunnyvale, CA (US); Sammy Omari, Los Altos, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 656 days.

(21) Appl. No.: 17/132,945

(22) Filed: Dec. 23, 2020

(65) Prior Publication Data
US 2022/0198096 A1    Jun. 23, 2022

(51) Int. Cl.
*G06F 30/20*    (2020.01)
*G07C 5/08*     (2006.01)
*G06F 30/27*    (2020.01)

(52) U.S. Cl.
CPC ............. *G06F 30/20* (2020.01); *G07C 5/085* (2013.01); *G06F 30/27* (2020.01)

(58) Field of Classification Search
CPC .......... G06F 30/20; G06F 30/27; G07C 5/085
See application file for complete search history.

(56) References Cited

U.S. PATENT DOCUMENTS

| | | | |
|---|---|---|---|
| 9,946,259 B2* | 4/2018 | Keller | G01S 17/931 |
| 2018/0136644 A1* | 5/2018 | Levinson | H04L 41/0816 |
| 2020/0139959 A1* | 5/2020 | Akella | B60W 60/0015 |
| 2021/0148727 A1* | 5/2021 | Narayanan | G06V 40/20 |
| 2022/0332350 A1* | 10/2022 | Jha | H04W 4/024 |

OTHER PUBLICATIONS

Kim YH, Shin DK, Ahmed MU, Rhee PK. Hierarchical open-set object detection in unseen data. Symmetry. Oct. 11, 2019;11(10):1271. (Year: 2019).*

* cited by examiner

*Primary Examiner* — Chuen-Meei Gan
(74) *Attorney, Agent, or Firm* — Christopher G. Darrow; Darrow Mustafa PC

(57) ABSTRACT

In one embodiment, a method includes receiving parameter data associated with trajectories captured using at least one sensor associated with one or more vehicles, determining a parameter distribution associated with movement parameters for the parameter data based on the trajectories, adjusting the parameter distribution for the parameter data associated with the movement parameters up to a respective threshold constraint, wherein the respective threshold constraint is based on at least one of the parameter data, generating driving simulations that are based on the adjusted parameter distribution for the parameter data, and evaluating an autonomous-driving system using the driving simulations.

20 Claims, 8 Drawing Sheets

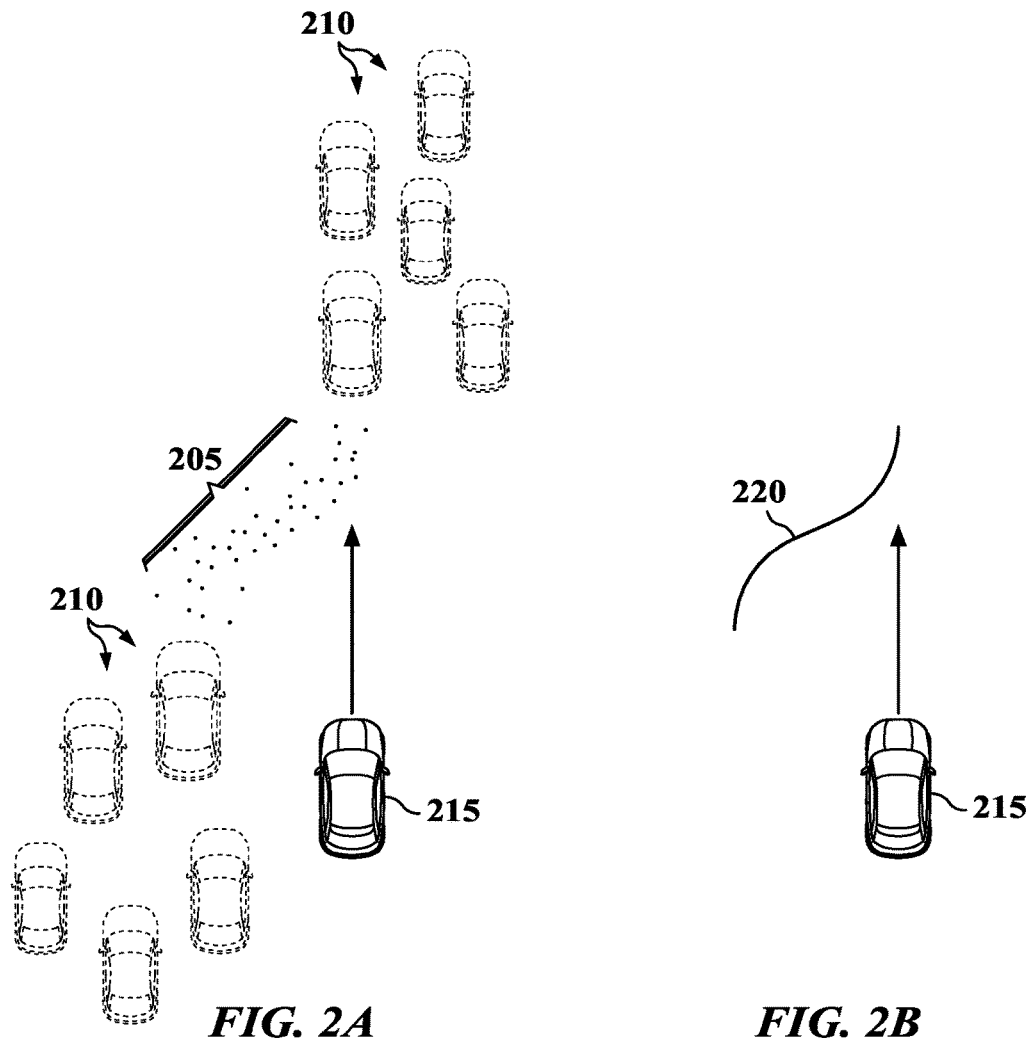
*FIG. 2A*  *FIG. 2B*
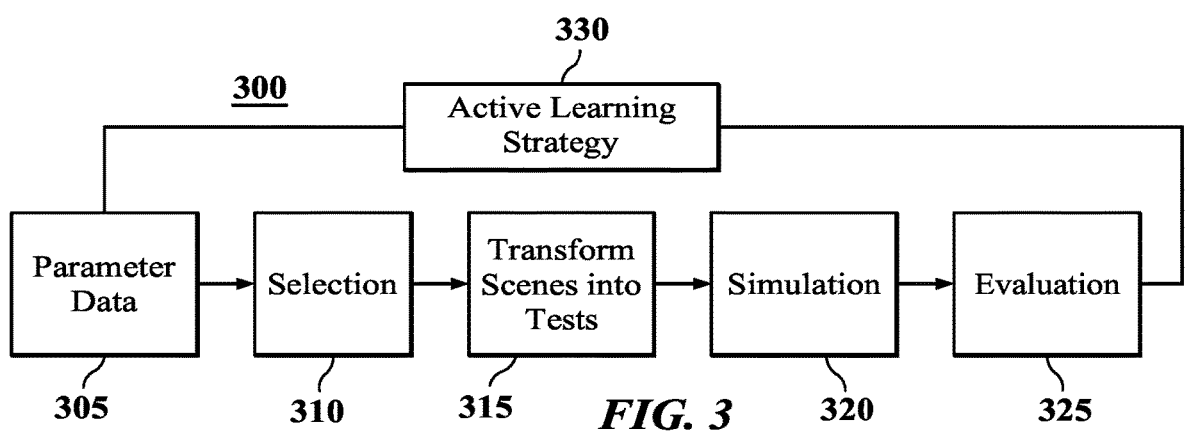
*FIG. 3*

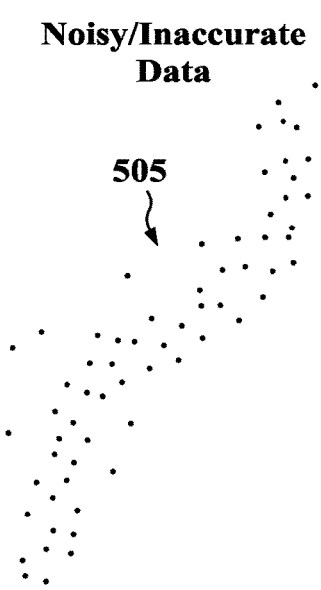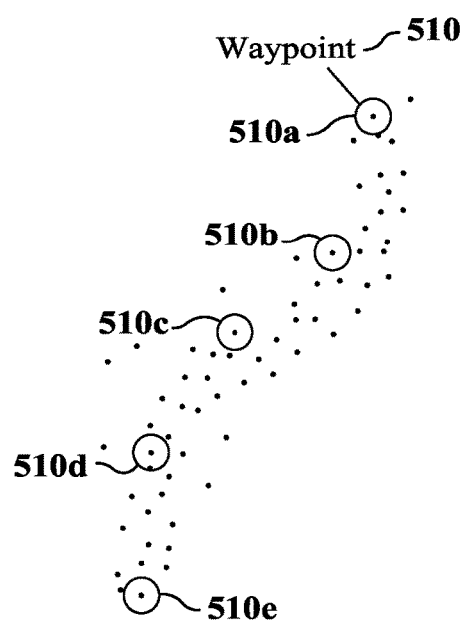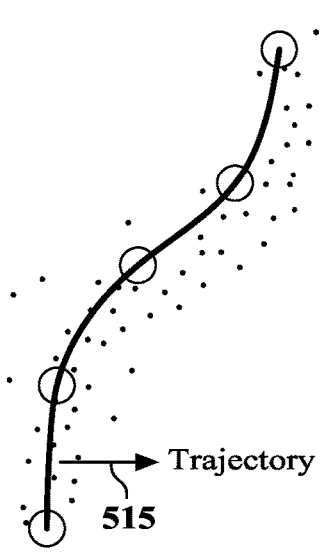
*FIG. 5A*     *FIG. 5B*     *FIG. 5C*

GENERATING ACCURATE AND DIVERSE SIMULATIONS FOR EVALUATION OF AUTONOMOUS-DRIVING SYSTEMS

BACKGROUND

A self-driving car, also known as an autonomous vehicle (AV), connected and autonomous vehicle (CAV), driverless car, robot-car, or robotic car, is a vehicle that is capable of sensing its environment and moving safely with little or no human input. Self-driving cars combine a variety of sensors to perceive their surroundings. Advanced control systems interpret sensory information to identify appropriate navigation paths, as well as obstacles and relevant signage. The testing of vehicles with varying degrees of automation can be carried out either physically, in a closed environment or, where permitted, on public roads (typically requiring a license or permit, or adhering to a specific set of operating principles), or in a virtual environment, i.e. using computer simulations.

BRIEF DESCRIPTION OF THE DRAWINGS

FIG. 2A illustrates example data collected by vehicles equipped with low-sensitivity sensors for the vehicle-cutting-in-lane scenario.

FIG. 2B illustrates an example blueprint trajectory of a vehicle cutting in the lane.

FIG. 3 illustrates an example workflow for generating simulation test data to evaluate an autonomous-driving system.

FIG. 5A illustrates example data collected by vehicles equipped with low-sensitivity sensors for the vehicle-cutting-in-lane scenario.

FIG. 5B illustrates example waypoints for the vehicle-cutting-in-lane scenario.

FIG. 5C illustrates an example smooth trajectory generated for the vehicle-cutting-in-lane scenario.

DESCRIPTION OF EXAMPLE EMBODIMENTS

Figure 1B:
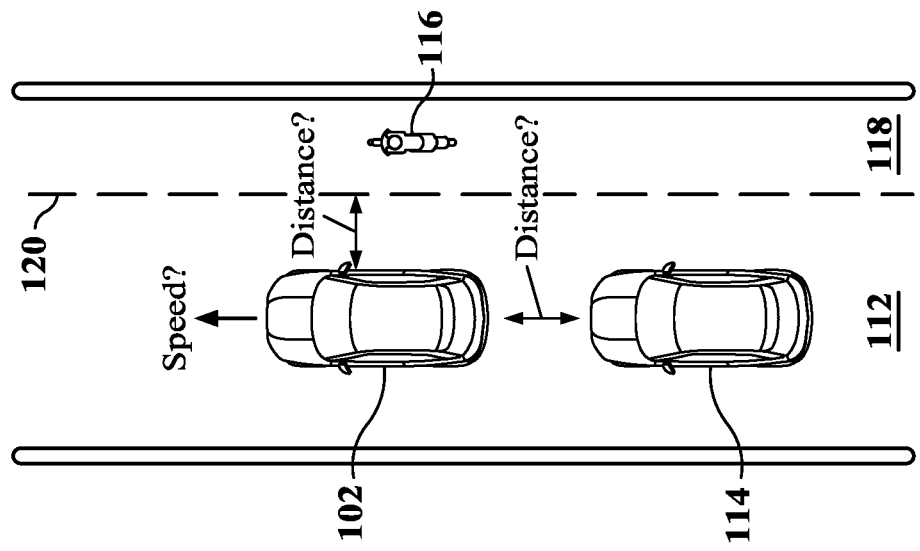
FIG. 1B illustrates an example vehicle-passing-by-a-cyclist driving scenario.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A simulation is an approximate imitation of the operation of a process or system that represents its operation over time. Simulation is used in many contexts, such as simulation of technology for performance tuning or optimizing, safety engineering, testing, training, education, and video games. Often, computer experiments are used to study simulation models. Simulation is also used with scientific modelling of natural systems or human systems to gain insight into their functioning, as in economics. Simulation can be used to show the eventual real effects of alternative conditions and courses of action. Simulation is also used when the real system cannot be engaged, because it may not be accessible, or it may be dangerous or unacceptable to engage, or it is being designed but not yet built, or it may simply not exist. Key issues in simulation include the acquisition of valid sources of information about the relevant selection of key characteristics and behaviors, the use of simplifying approximations and assumptions within the simulation, and fidelity and validity of the simulation outcomes. Procedures and protocols for model verification and validation are an ongoing field of academic study, refinement, research and development in simulations technology or practice, particularly in the work of computer simulation.

Large amount of data representative of the world may be necessary for simulation test of the performance of autonomous vehicles (AV). The simulation test may help determine the solutions in various scenarios an autonomous vehicle may find itself in. As an example and not by way of limitation, these scenarios may include if the autonomous vehicle is near a traffic light or a stop sign, how does it relate to lane boundaries, how do other agents behave in the world around the autonomous vehicle, is there any vehicle cutting in, is there anything in front of the autonomous vehicle, is there anyone stopping in front of the autonomous vehicle, etc. Corresponding to these scenarios, the simulation test may test how the autonomous vehicle performs, e.g., whether it collides with any of the agents in the simulation, whether it drives smoothly, whether its trajectory matches more or less with that of a human-driving vehicle in the simulations, etc. The simulation test may help determine whether the autonomous vehicle performance is good enough to react accurately and efficiently to these aforementioned scenarios. If the autonomous vehicle does well in a simulation test based on such data, we may have high confidence that the autonomous vehicle may carry out the job of self-driving in the real world.

For effective simulation test, the testing data should be representative of the world having extensive coverage of diverse scenarios on the road and also have high accuracy. FIGS. 1A-1D illustrates example driving scenarios for simulation tests. FIG. 1A illustrates an example vehicle-cutting-in-lane driving scenario. Vehicle 102 may be an autonomous vehicle driving in lane 104. Another vehicle 106 may be driving in lane 108 and changing from lane 108 to lane 104. The simulation test of the performance of the autonomous vehicle 102 in such scenario may include but not limited to evaluating its speed, distance to the lane separator 110, etc. in response to another vehicle 106 cutting in the lane. As an example and not by way of limitation, the speed of vehicle 102 should be reduced when vehicle 106 is cutting in the lane to avoid collision. If the speed of vehicle 102 instead increases in the simulation test, that may indicate problems of the autonomous-driving system. For the scenario in FIG. 1A, the testing data should be accurate for effective simulation test of an autonomous vehicle's behavior. The testing data should also cover as many plausible situations as possible in the vehicle-cutting-in-lane scenario. As an example and not by way of limitation, there should be a range of possible speed of vehicle 106 when making the lane change but the range should be also realistic, i.e., constrained by real-world driving conditions.

Figure 1A:
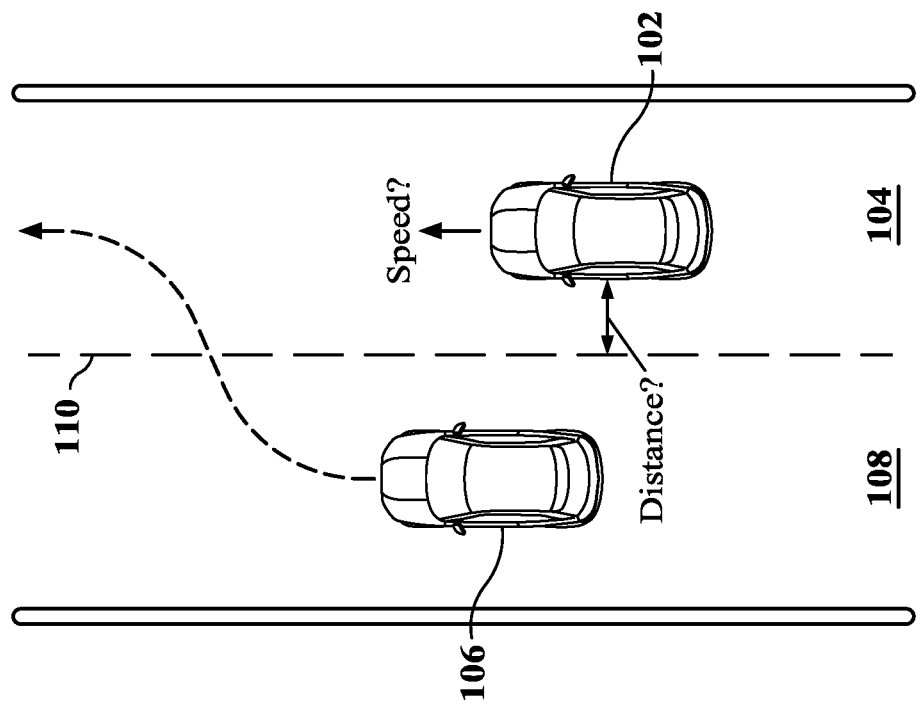
FIG. 1A illustrates an example vehicle-cutting-in-lane driving scenario.

FIG. 1B illustrates an example vehicle-passing-by-a-cyclist driving scenario. Vehicle 102 may be the autonomous vehicle driving in lane 112 followed by another vehicle 114. A cyclist 116 may be in a bike lane 118. The simulation test of the performance of the autonomous vehicle 102 in such scenario may include but not limited to evaluating its speed, distance to the lane separator 120, distance to vehicle 114, etc. when passing by the cyclist 116. As an example and not by way of limitation, the distance of vehicle 102 to the lane separator 120 should be larger than a threshold distance. As another example and not by way of limitation, the distance of vehicle 102 to vehicle 114 should be larger than another threshold distance. If the distance of vehicle 102 to the lane separator 120 or vehicle 114 is smaller than the threshold distance in the simulation test, that may indicate problems of the autonomous-driving system as when implemented in the real world there may be a risk of an autonomous vehicle hitting a cyclist or being hit by a vehicle from behind. Similarly, for the scenario in FIG. 1B, the testing data should be accurate for effective simulation test of an autonomous vehicle's behavior. The testing data should also cover as many plausible situations as possible in the vehicle-passing-by-a-cyclist scenario. As an example and not by way of limitation, there should be a range of possible distances between vehicle 102 and the lane separator 120 and between vehicle 102 and vehicle 114 but the range should be also realistic, i.e., constrained by real-world driving conditions.

Figure 1D:
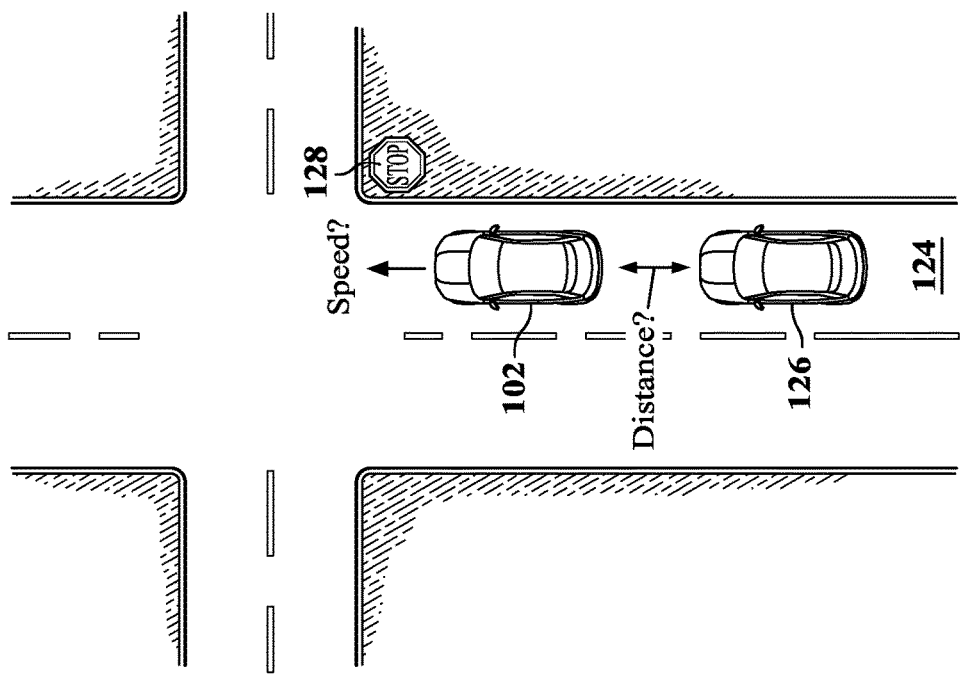
FIG. 1D illustrates an example vehicle-approaching-a-stop-sign driving scenario.
Figure 1C:
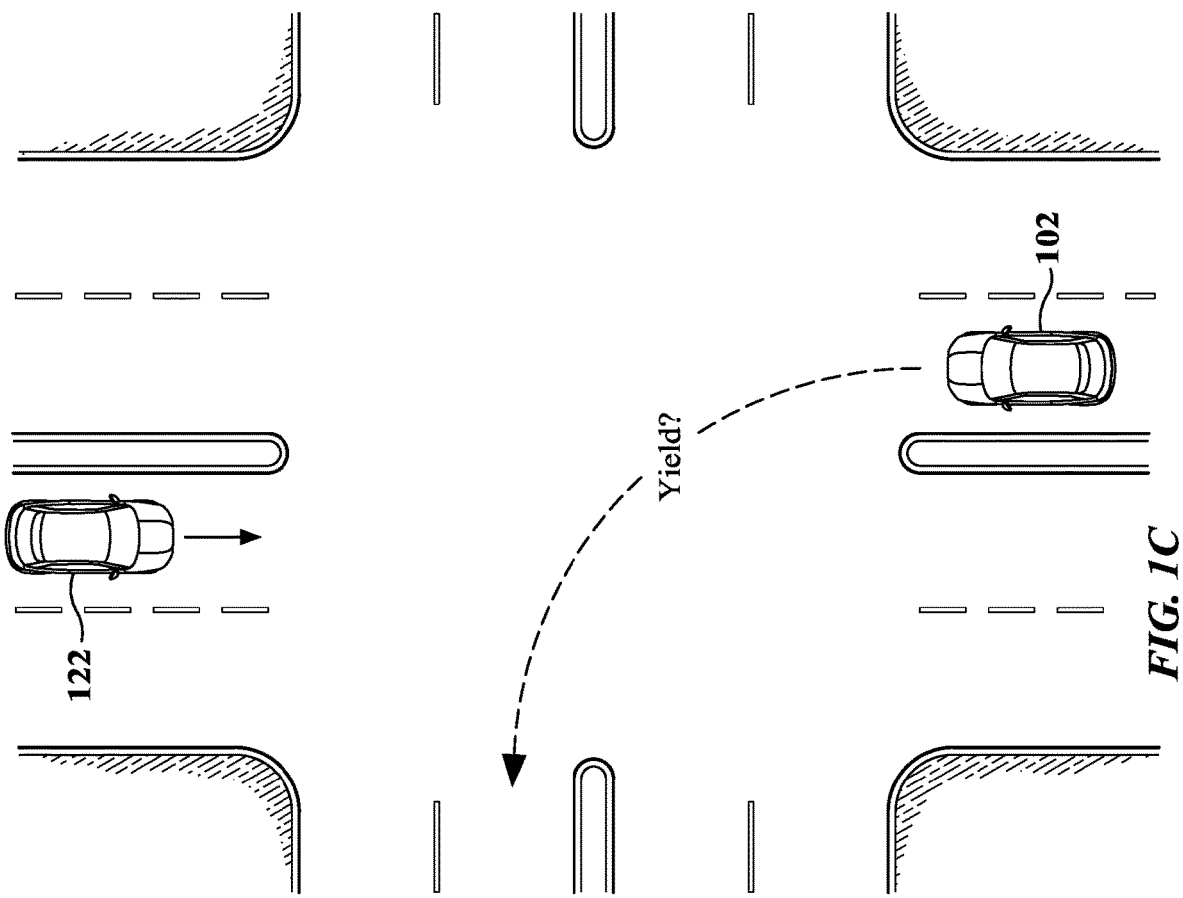
FIG. 1C illustrates an example vehicle-turning-left driving scenario.

FIG. 1C illustrates an example vehicle-turning-left driving scenario. Vehicle 102 may be the autonomous vehicle turning left in an intersection. Another vehicle 122 may be coming from an opposite direction. The simulation test of the performance of the autonomous vehicle 102 in such scenario may include but not limited to evaluating whether it yields to vehicle 122 when turning left. As an example and not by way of limitation, if the amount of time vehicle 102 spent in the middle of the intersection is smaller than a threshold value, that may indicate problems of the autonomous-driving system as vehicle 102 may fail to yield to vehicle 122. Similarly, for the scenario in FIG. 1C, the testing data should be accurate for effective simulation test of an autonomous vehicle's behavior. The testing data should also cover as many plausible situations as possible in the vehicle-turning-left scenario. As an example and not by way of limitation, there should be a range of possible speed of vehicle 122 coming towards vehicle 102 but the range should be also realistic, i.e., constrained by real-world driving conditions.

FIG. 1D illustrates an example vehicle-approaching-a-stop-sign driving scenario. Vehicle 102 may be an autonomous vehicle driving in lane 124 followed by another vehicle 126. Vehicle 102 may be approaching a stop sign 128. The simulation test of the performance of the autonomous vehicle 102 in such scenario may include but not limited to evaluating its speed, distance to vehicle 126, etc. when approaching the stop sign 128. As an example and not by way of limitation, the speed of vehicle 102 should be gradually reduced but its distance to vehicle 126 should be larger than a threshold distance. If the speed of vehicle 102 is not decreasing in the simulation test, that may indicate problems of the autonomous-driving system as it is common practice to gradually reduce speed when approaching a stop sign. If the distance of vehicle 102 to vehicle 126 is smaller than the threshold distance in the simulation test, that may also indicate problems of the autonomous-driving system. For example, if the speed of vehicle 102 suddenly decreases substantially its distance to vehicle 126 may become smaller than the threshold distance. Similarly, for the scenario in FIG. 1D, the testing data should be accurate for effective simulation test of an autonomous vehicle's behavior. The testing data should also cover as many plausible situations as possible in the vehicle-approaching-a-stop-sign scenario. As an example and not by way of limitation, there should be a range of possible speed of vehicle 126 following vehicle 102 to test whether an autonomous vehicle will react effectively to adjust its speed to make sure it is slowing down when approaching the stop sign 128 but also guaranteeing its distance to the following vehicle is large enough to avoid collision. However, the range should be realistic, i.e., constrained by real-world driving conditions.

As can be seen in the examples in FIGS. 1A-1D, effective testing of AVs may rely on complete and accurate/high-quality data collection of all the scenarios desired to be captured. However, obtaining such complete and accurate/high-quality data from real-world encounters is challenging. The first challenge may be collecting complete data capturing all the scenarios that are required for testing an autonomous-driving system. A reliable way for data collection may be using autonomous vehicles driving around to capture data using sophisticated AV sensors such as Lidar. Such data may be referred to as AV-collected data. However, using such an approach to collect complete data capturing all the scenarios may be unrealistic as it is formidably expensive to have autonomous vehicles equipped with sophisticated sensors driving around extensively. Additionally, it may be difficult to capture complete data from all scenarios due to the rarity in which these scenarios occur in the real world.

To be more realistic and to capture more complete data from real world situations, one may rely on a large number of human-driving vehicles equipped with cheaper and less sophisticated sensors (e.g., cameras, GPS sensor, odometry inertial measurement units) compared to sophisticated AV sensors to capture data capturing all the scenarios. However, the accuracy and quality of such data may not measure up to data collected by autonomous vehicles using sophisticated AV sensors because it balances using cheaper sensors to collect a higher volume of data and at a lower cost. As an example and not by way of limitation, the data may contain inaccuracies about the positions, trajectories, and speed of agents, etc. because of the low sensitivity of the sensors. The data may be also incomplete, e.g., missing capturing the agents because the cameras cannot see quite far ahead or don't have 360-degree field of view. FIGS. 2A-2B illustrate an example comparison between data collected by vehicles equipped with low-sensitivity sensors and a blueprint trajectory. FIG. 2A illustrates example data collected by vehicles equipped with low-sensitivity sensors for the vehicle-cutting-in-lane scenario. In FIG. 2A, the data 205 collected for the vehicle-cutting-in-lane scenario by low-sensitivity sensors associated with many vehicles 210 may be represented by all the dots. As can be seen, these dots are noisy and have accuracy issues as they spread all over different parts of the lane. Using such data 205 to generate simulation test data, e.g., a trajectory reflecting the real-world vehicle-cutting-in-lane scenario may be unreliable for testing an autonomous vehicle 215 in an autonomous-driving system.

FIG. 2B illustrates an example blueprint trajectory for the vehicle-cutting-in-lane scenario. The trajectory 220 in FIG. 2B may be the ideal trajectory that should be served as the testing data in a simulation test. Only with such accurate trajectory 220 can the simulation test determine whether an autonomous-driving system will react effectively when encountering another vehicle cutting in the lane. As discussed above, even if the data collected by vehicles equipped with low-sensitivity sensors cover all sorts of scenarios, they may cause unreliable simulation test for an autonomous-driving system in each scenario as the data may be incomplete or have accuracy issues. In turn, using such simulation tests to predict what may happen for an autonomous vehicle in real-world scenarios may be unreliable. However, the advantage of such data, e.g., much larger scale than data collected with autonomous vehicles equipped with high-quality sensors, no need for high-quality maps to get the data in many more areas, higher diversity of environments, etc., if properly leveraged, may help generate reliable testing data for simulation test of behaviors of autonomous vehicles.

To obtain sufficient testing data that is both accurate and diverse (i.e., capturing all the driving scenarios), the embodiments disclosed herein may use different approaches to generate testing data based on data collected by vehicles equipped with low-sensitivity sensors. The data may be collected by fleet vehicles, rideshare vehicles, other autonomous-driving vehicles, etc. as long as these vehicles are implemented with these low-sensitivity sensors. In one approach, a computing system may generate testing data directly from such data simulating what we have observed in the world. In another approach, the computing system may determine low-level parameters that characterize features of the observed scenes from such data and then build testing data on top of these parameters. In yet another approach, the computing system may determine key trajectory features of a scene in such data, create a smooth trajectory that fits these trajectory features using interpolations, and then generate testing data based on the smooth trajectory. In particular embodiments, a smooth trajectory may satisfy position and velocity boundary conditions at start and end points with high precision. The smooth trajectory may additionally respect collision, velocity, acceleration and jerk constraints. The generated testing data may have extended coverage of real-world scenarios as the embodiments disclosed herein may fabricate data corresponding to new scenarios that haven't been captured in the real world.

In particular embodiments, a computing system may receive parameter data associated with one or more trajectories captured using at least one sensor associated with one or more vehicles. The computing system may then determine, based on the one or more trajectories, a parameter distribution associated with one or more movement parameters for the parameter data. In particular embodiments, the computing system may adjust the parameter distribution for the parameter data associated with the one or more movement parameters up to a respective threshold constraint. The respective threshold constraint may be based on at least one of the parameter data or the one or more movement parameters. The computing system may further generate one or more driving simulations that are based on the adjusted parameter distribution for the parameter data. In particular embodiments, the computing system may evaluate an autonomous-driving system using the one or more driving simulations.

FIG. 3 illustrates an example workflow 300 for generating simulation test data to evaluate an autonomous-driving system. The computing system may receive parameter data 305 associated with trajectories. As an example and not by way of limitation, the parameter data 305 may comprise information comprising one or more of distances between a vehicle and an agent around the vehicle in the scene, lane boundaries associated with the scene, velocities of the vehicle and the agent, driving directions of the vehicle and the agent, yield relationships between the vehicle and the agent, locations of the vehicle and the agent, or positional relationship between the vehicle and the agent. In particular embodiments, the computing system may perform selection 310 to identify the most relevant parts of what has been observed in the parameter data 305. The computing system may then transform scenes in the parameter data 305 into tests 315 based on the identified parts of the parameter data 305. In particular embodiments, the computing system may further generate driving simulations 320 from the tests. As an example and not by way of limitation, the computing system may use the parameter data 305 to build a model of what the agents do and then create simulation tests where the agent may drive according to this model. In particular embodiments, the computing system may determine a confidence score for each of the trajectories based on a plurality of high-quality data captured using one or more high-quality sensors associated with a plurality of autonomous-driving vehicles. The one or more high-quality sensors may have higher accuracy than the at least one sensor. The computing system may then select one or more of the trajectories based on their respective confidence scores. The selected trajectories each may have a confidence score greater than a threshold score. Correspondingly, generating the one or more driving simulations 320 may be based on the adjusted parameter distributions associated with the selected trajectories. The generated driving simulations 320 may be used for evaluation 325 of the autonomous-driving system. The evaluation results may be analyzed based on active learning strategies 330. As an example and not by way of limitation, the active learning strategies 330 may help determine what test to add, what training data to add for the data-driven planner, how to improve evaluators, or how to improve reactive agents, etc.

In particular embodiments, the computing system may use different approaches to generate testing data for simulation test. The first approach may be a direct approach based on data collected by vehicles equipped with low-sensitivity sensors simulating what we have observed in the world. Such data may be a very large-scale data collection. When creating the simulation test data using such data, the computing system may generate a plurality of data associated with a driving environment such as location, perception, trajectory, agents around autonomous vehicles, etc. Taking the scenario in FIG. 1A as an example, such data may provide observations of a particular way in which another vehicle may have cut in the lane. The computing system may take the data that covers vehicle-cutting-in-lane scenarios and map the scenarios to simulation test data directly based on the data. The generated simulation test data may not miss any agents, e.g., the traffic lights in the simulation test data are actually the traffic lights that exist in the real world.

Figure 4:
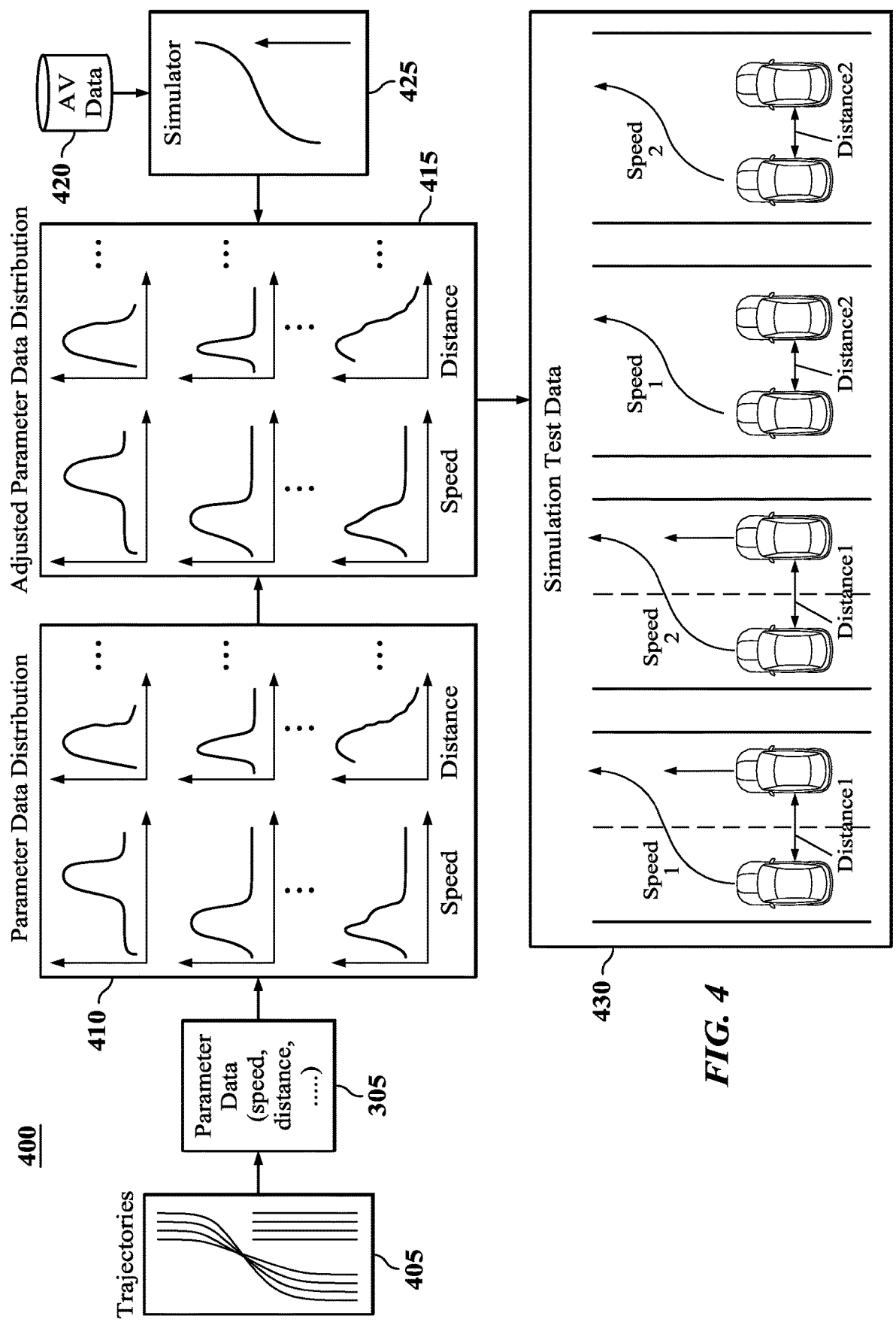
FIG. 4 illustrates an example workflow for generating simulation test data based on low-level parameters that characterize features of the observed scenes.

The second approach may be an indirect approach built upon low-level parameters that characterize features of the observed scenes from data collected by vehicles equipped with low-sensitivity sensors. FIG. 4 illustrates an example workflow 400 for generating simulation test data based on low-level parameters that characterize features of the observed scenes. Taking the scenario in FIG. 1A as an example, the approach may be illustrated as follows. The trajectories 405 may comprise observations of the contingencies of vehicles' cutting-ins. Instead of replaying them one by one, the computing system may extract permittance from the parameter data 305 associated with the trajectories 405. To begin with, the computing system may identify key movement parameters of the vehicle-cutting-in-lane scenarios in the parameter data 305. As an example and not by way of limitation, the movement parameters may comprise the speed of a vehicle cutting in the lane or the speed difference between the vehicle cutting in the lane and an autonomous vehicle. As another example and not by way of limitation, the movement parameters may comprise the distance between the autonomous vehicle and the vehicle cutting in the lane. The second step may be to measure parameter values and create a parameter distribution 410 accordingly. As an example and not by way of limitation, a movement parameter may be speed, for which the corresponding parameter value may be 15 miles per hour, 30 miles per hour, or 60 miles per hour. The computing system may measure a corresponding parameter value for each of the movement parameters. As a result, the parameter distribution 410 for the movement parameters may be determined based on the corresponding parameter value. The parameter distribution 410 may indicate how other people tend to behave when they are cutting in the lane. In particular embodiments, the computing system may determine a frequency for each parameter value. With the determined frequencies, evaluating the autonomous-driving system may comprise a statistical risk computation based on the frequencies for the plurality of parameter values.

In particular embodiments, the parameter distribution 410 generated from the data collected by vehicles equipped with low-sensitivity sensors may provide limited and/or restricted information on what could happen in the real world. To diversify the coverage of the real-world scenarios, e.g., what could happen even if no data captured such possibility, the computing system may adjust the parameter distribution 410 by relaxing the parameters associated with it to diversify the observed scenes and create more interesting driving scenarios. The computing system may focus on the deviations that could happen and deviate from what has been observed by relaxing some parameters for generating simulation test data of vehicle-cutting-in-lane scenarios. In particular embodiments, the parameterizations and obstacle space description may be seen as constraints, which may be generated from the data collected by vehicles equipped with low-sensitivity sensors. The computing system may then use those constraints to sample from a larger distribution. In particular embodiments, the computing system may adjust the parameter distribution 410 for the parameter data associated with the one or more movement parameters further based on one or more principles associated with the trajectories 405. In particular embodiments, the principles may comprise one or more of parameters or constraints of the trajectories. As illustrated in FIG. 4, the adjusted parameter distribution 415 may be slightly different from the original parameter distribution 410. This may indicate that the adjusted parameter distribution 415 covers more scenarios but also not deviates too much from the original parameter distribution 410 to become unrealistic. With the second approach, the computing system may generate some other similar vehicle-cutting-in scenarios that are not observed but still plausible, which may be considered as modifications of the parameter data 305. As an example and not by way of limitation, there may be a vehicle cutting in the lane in the data collected by vehicles equipped with low-sensitivity sensors. The computing system may relax the parameters by sampling from a more diverse parameter distribution, e.g., changing the behaviors of the vehicle cutting in the lane. This way, the computing system may gradually create all kinds of different scenarios which we may choose from. To this end, by re-combining different things that exist within the scene, the computing system may quickly create a whole exponential amount of example scenarios from a small amount of data. In particular embodiments, the parameter data 305 may correspond to one or more first driving scenarios associated with the one or more trajectories captured using the at least one sensor. However, the adjusted parameter distribution for the parameter data may correspond to one or more second driving scenarios associated with the one or more driving simulations, in which the second driving scenarios may be different from the first driving scenarios.

Taking the vehicle-cutting-in-lane scenario in FIG. 1A as an example, the adjustment of the parameter distribution 410 may be illustrated as follows. Suppose vehicle 106 cuts in front of the autonomous vehicle 102 with a sudden speed. The parameter data 305 may reveal that the speed may be 16 miles per hour but there has been no observation of any vehicle cutting in lane with a speed of 15 miles per hour. Since speed is continuous, one may also simulate cutting-in-lanes with speed that we have not observed on the road in the real world, which may be the missing points in the middle of the parameter distribution 410. As an example and not by way of limitation, the distribution of the speed may be within a range of 12 miles per hour to 16 miles per hour. The observed speed in the real world may include 12, 13, 14, and 16 but no 15 miles per hour. Then the computing system may create an insertion point at 15 miles per hour. Furthermore, the computing system may also simulate an insertion point 11 miles per hour and an insertion point at 17 miles per hour because there may be some low probability consistencies where vehicle 106 is driving at 11 or 17 miles per hours. This way, the computing system may simulate some possible vehicle-cutting-in-lane scenarios that are close enough to what has been observed on the road by extending the input and coverage. In particular embodiments, generating the one or more driving simulations may comprise generating one or more additional trajectories based on the adjusted parameter distribution for the parameter data. The additional trajectories may be different from the trajectories 405 captured using the at least one sensor associated with the one or more vehicles. As an example and not by way of limitation, the computing system may take a trajectory of a vehicle in front of an autonomous vehicle in the AV-collected data. The computing system may then stretch the trajectory to be farther away from the autonomous vehicle to simulate a more well-behaved cutting in lane or closer to the autonomous vehicle to simulate a more aggressive cutting in lane.

In particular embodiments, one may observe the real-world scenarios more accurately with the AV-collected data and less accurately with the data collected by vehicles equipped with low-sensitivity sensors. Therefore, the computing system may use the AV-collected data 420 to make the observation of the real world more accurately. To do so, the computing system may create synthesized driving-scenario simulator 425 (a.k.a., simulation template) with identified parameters. The driving-scenario simulator 425 may be considered as an accurate blueprint, i.e., a natural traffic point that is obtained from the AV-collected data 420. In particular embodiments, the computing system may generate a driving-scenario simulator 425 based on a plurality of high-quality data captured using one or more high-quality sensors associated with a plurality of autonomous-driving vehicles, i.e., the AV-collected data 420. The one or more high-quality sensors may have higher accuracy than the at least one sensor. In particular embodiments, generating the one or more driving simulations may be further based on the driving-scenario simulator. As an example and not by way of limitation, the computing system may further generate simulation test data 430 by integrating the adjusted parameter distribution 415 with the driving-scenario simulator 425. As an example and not by way of limitation, the driving-scenario simulator 425 may comprise a vehicle-cutting-in-lane blueprint. Then the computing system may parametrize this blueprint based on the adjusted parameter distribution 415. For instance, the computing system may select an accurate trajectory of an observed vehicle near an autonomous vehicle, which is the blueprint from the AV-collected data 420. The computing system may then parameterize the trajectory based on the adjusted parameter distribution 415, e.g., by making the trajectory cutting in front of the autonomous vehicle. This way, the inaccuracies in the data collected by vehicles equipped with low-sensitivity sensors (e.g., not observing the cutting-in vehicle due to no camera coverage on the side) may be removed by the accurate trajectory. As a result, the generated simulation test data 430 may be more accurate and less noisy thanks to simulation based on the measured parameters. Furthermore, the generated simulation test data 430 may have a better coverage of real-world scenarios thanks to the large amount of data collected by vehicles equipped with low-sensitivity sensors. As illustrated in FIG. 4, the simulation test data 430 may comprise test data based on different combinations of speed of the cutting-in vehicle and its distance to an autonomous vehicle, e.g., speed 1 with distance 1, speed 2 with distance 1, speed 1 with distance 2, and speed 2 with distance 2.

In particular embodiments, the third approach may be using key trajectory features of the trajectories 405. The computing system may identify one or more trajectory features associated with each of the one or more trajectories 405 based on the corresponding parameter data 305. The computing system may then create a smooth trajectory that fits the one or more trajectory features for each of the trajectories 405. In particular embodiments, a smooth trajectory fitting trajectory features may indicate the trajectory has the best fit to a series of data points represented by the trajectory features (e.g., based on mathematical functions), possibly subject to constraints. The fitting of these trajectory features may involve either interpolation, where an exact fit to the data is required, or smoothing, in which a "smooth" function is constructed that approximately fits the data. As an example and not by way of limitation, the smooth trajectory may not exceed the bounds of the trajectory features. e.g., if the trajectory feature is 30 degrees angle then the trajectory cannot exceed that. In particular embodiments, the computing system may determine a respective confidence score for each of the one or more trajectory features. The computing system may then rank the one or more trajectory features based on their respective confidence scores. The computing system may further select one or more top-ranked trajectory features. Under this condition, creating the smooth trajectory may be based on the one or more top-ranked trajectory features. In particular embodiments, generating the one or more driving simulations may be further based on the smooth trajectory for each of the trajectories 405.

In particular embodiments, the one or more trajectory features may comprise one or more of a waypoint corresponding to a snapshot of an agent (e.g., vehicle or pedestrian) in time, a distance of the trajectory to the agent, an acceleration associated with the trajectory, a speed associated with the trajectory, a comfort feature associated with the trajectory, or a safety feature associated with the trajectory. In particular embodiments, the waypoint may be specified in absolute coordinates, e.g., (x-axis, y-axis, z-axis, and time). In alternative embodiments, the waypoint may be specified in relative coordinates (e.g., in the middle of the right lane, one second after the light turns red, etc.). In particular embodiments, the computing system may take trajectory features associated with the trajectory 405 and generate one or more interpolations between the one or more trajectory features (e.g., by placing them one every second). After that, simulation test data 435 may be generated by creating a smooth trajectory that fits the trajectory features. In particular embodiments, interpolation may be in-betweening, or filling the data points of a trajectory based on the trajectory features. The interpolations may calculate the in-between trajectory features through use of, e.g., polynomial interpolations. These trajectory features may correspond to measurements that are rather widely separated in space or time, and represent the desired result, but only in very coarse steps. The interpolation process may be then used to insert many new measurements in between these trajectory features to give a "smoother" result.

FIGS. 5A-5C illustrates an example generation of a smooth trajectory based on waypoints. FIG. 5A illustrates example data 505 collected by vehicles equipped with low-sensitivity sensors for the vehicle-cutting-in-lane scenario. As can be seen, such data 505 may be noisy and have accuracy issues, making it difficult to generate reliable simulation test data 430. FIG. 5B illustrates example waypoints for the vehicle-cutting-in-lane scenario. The computing system may identify a plurality of waypoints 510, e.g., waypoint 510*a*, waypoint 510*b*, waypoint 510*c*, waypoint 510*d*, and waypoint 510*e*, from the noisy/inaccurate data 505 collected by vehicles equipped with low-sensitivity sensors. FIG. 5C illustrates an example smooth trajectory generated for the vehicle-cutting-in-lane scenario. Based on the identified waypoints 510 in FIG. 5B, the computing system may generate a smooth trajectory 515 that fits these waypoints 510 using interpolations. Here interpolation may be filling the data points of the trajectory based on the waypoints. Such smooth trajectory 515 may be further used to generate reliable simulation test data 430 for the vehicle-cutting-in-lane scenario.

Figure 6:
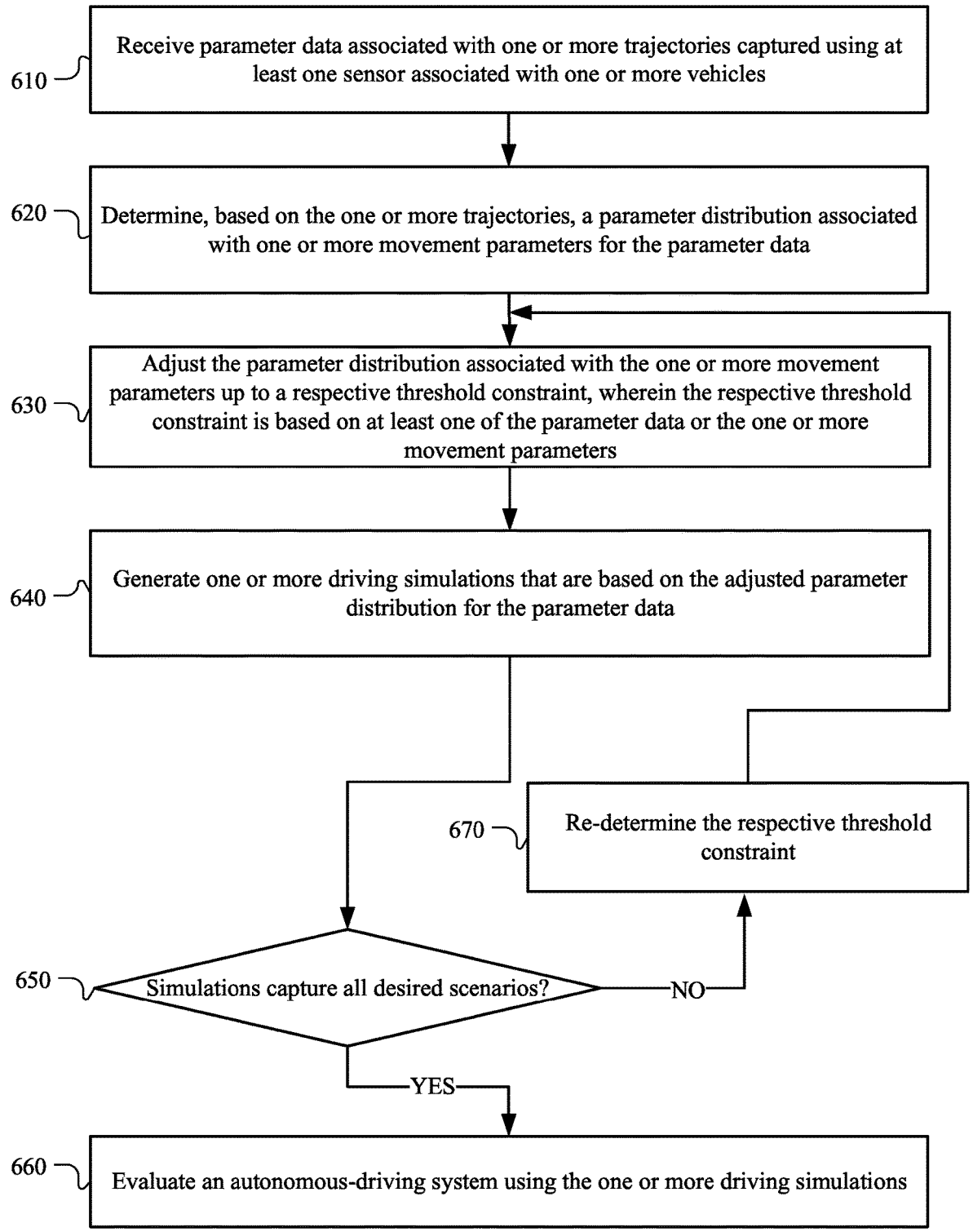
FIG. 6 illustrates an example of a method for generating simulation test data.

FIG. 6 illustrates an example method 600 for generating simulation test data 430. The method may begin at step 610, where a computing system may receive parameter data 305 associated with one or more trajectories 405 captured using at least one sensor associated with one or more vehicles. At step 620, the computing system may determine, based on the one or more trajectories 405, a parameter distribution 410 associated with one or more movement parameters for the parameter data 305. At step 630, the computing system may adjust the parameter distribution 410 for the parameter data associated with the one or more movement parameters up to a respective threshold constraint, wherein the respective threshold constraint is based on at least one of the parameter data 305 or the one or more movement parameters. At step 640, the computing system may generate one or more driving simulations that are based on the adjusted parameter distribution 415 for the parameter data. At step 650, the computing system may analyze whether the one or more driving simulations capture all desired scenarios. If the one or more driving simulations capture all desired scenarios, the method may proceed to step 660, where the computing system may evaluate an autonomous-driving system using the one or more driving simulations. If the one or more driving simulations do not capture all desired scenarios, the method may proceed to step 670, where the computing system may re-determine the respective threshold constraint. The method may then repeat step 630 to step 650 until the driving simulations capture all desired scenarios, after which the method may proceed to step 660. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating simulation test data 435 including the particular steps of the method of FIG. 6, this disclosure contemplates any suitable method for generating simulation test data 435 including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
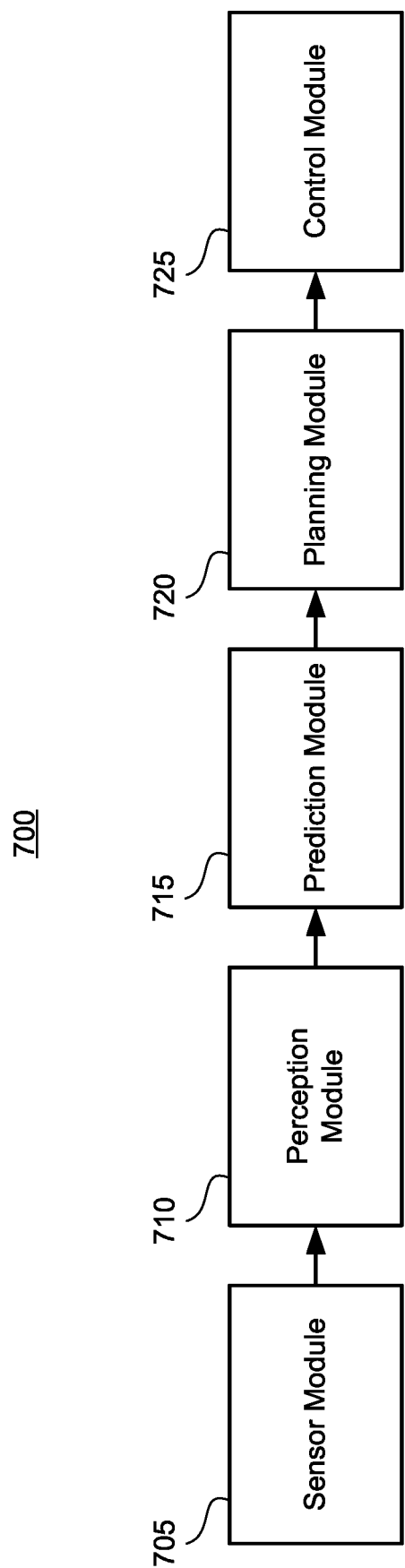
FIG. 7 illustrates an example of a processing pipeline for autonomous driving.

FIG. 7 illustrates an example block diagram of an algorithmic navigation pipeline. In particular embodiments, an algorithmic navigation pipeline 700 may include a number of computing modules, such as a sensor data module 705, perception module 710, prediction module 715, planning module 720, and control module 725. Sensor data module 705 may obtain and pre-process sensor/telemetry data that is provided to perception module 710. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 705 may suppress noise in the sensor data or normalize the sensor data.

Perception module 710 is responsible for correlating and fusing the data from the different types of sensors of the sensor module 705 to model the contextual environment of the vehicle. Perception module 710 may use information extracted by multiple independent sensors to provide information that would not be available from any single type of sensors. Combining data from multiple sensor types allows the perception module 710 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 710 could use that additional information to determine that the object in the poster is not, in fact, a three-dimensional object.

Perception module 710 may process the available data (e.g., sensor data, data from a high-definition map, etc.) to derive information about the contextual environment. For example, perception module 710 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 710 may also determine various characteristics of the agents. For example, perception module 710 may track the velocities, moving directions, accelerations, trajectories, relative distances, or relative positions of these agents. In particular embodiments, the perception module 710 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 710 could determine the pose (e.g., position and orientation) of the vehicle or the poses of the vehicle's sensors within the high-definition map. The pose information, in turn, may be used by the perception module 710 to query the high-definition map and determine what objects are expected to be in the environment.

Perception module 710 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 710 may be consumed by a prediction module 715 to generate one or more predictions of the future environment. For example, given a representation of the contextual environment at time $t_0$, the prediction module 715 may output another contextual representation for time $t_1$. For instance, if the $t_0$ contextual environment is represented by a raster image, the output of the prediction module 715 may be another raster image (e.g., a snapshot of the current environment) that depicts where the agents would be at time $t_1$ (e.g., a snapshot of the future). In particular embodiments, prediction module 715 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times $t_0$ and $t_1$. The captured data at times $t_0$ and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 720 may determine the navigation routes and particular driving operations (e.g., slowing down, speeding up, stopping, swerving, etc.) of the vehicle based on the predicted contextual representation generated by the prediction module 715. In particular embodiments, planning module 720 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 720 may determine a particular navigation path and associated driving operations for the vehicle to avoid possible collisions with one or more agents. In particular embodiments, planning module 720 may generate, based on a given predicted contextual presentation, several different plans (e.g., goals or navigation instructions) for the vehicle. For each plan, the planning module 720 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 720 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 720, which may include one or more navigation path or associated driving operations, control module 725 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 725 may transmit commands to a steering actuator to maintain a particular steering angle for a particular amount of time $t_0$ move a vehicle on a particular trajectory to avoid agents predicted to encroach into the area of the vehicle. As another example, control module 725 may transmit commands to an accelerator actuator to have the vehicle safely avoid agents predicted to encroach into the area of the vehicle.

Figure 8:
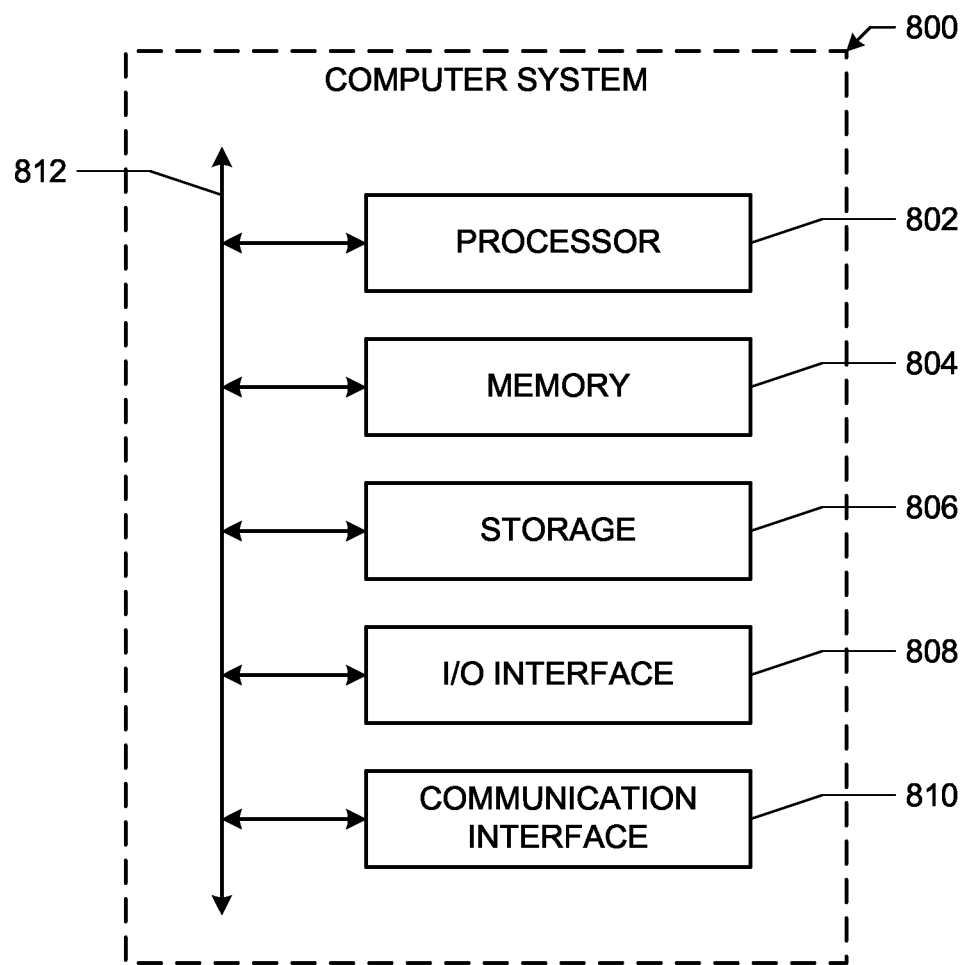
FIG. 8 illustrates an example of a computing system.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving parameter data associated with one or more trajectories captured using at least one sensor associated with one or more vehicles;
   determining, based on the one or more trajectories, a parameter distribution associated with one or more movement parameters for the parameter data that indicates variations for performing the one or more trajectories associated with behaviors of different drivers;
   adjusting the parameter distribution up to a respective threshold constraint, wherein the respective threshold constraint is based on at least one of the parameter data or the one or more movement parameters for varying driving scenes associated with the one or more trajectories;
   generating driving simulations that are based on the adjusted parameter distribution for the parameter data, the driving simulations being computer-generated occurrences of scenarios associated with the adjusted parameters;

evaluating an autonomous-driving system using the driving simulations, wherein evaluating the autonomous-driving system includes analyzing an evaluation result using an active learning strategy to determine modifications to training the autonomous-driving system, including whether to add a test, whether to add training data for a data-driven planner, and how to improve evaluators and reactive agents; and controlling an ego vehicle in an environment according to the autonomous-driving system trained by reactive agents within the driving simulations.

2. The method of claim 1, wherein the parameter data corresponds to one or more first driving scenarios associated with the one or more trajectories captured using the at least one sensor, wherein the adjusted parameter distribution for the parameter data correspond to one or more second driving scenarios associated with the driving simulations, and wherein the second driving scenarios are different from the first driving scenarios.

3. The method of claim 1, wherein generating the driving simulations comprises generating one or more additional trajectories based on the adjusted parameter distribution for the parameter data, and wherein the additional trajectories are different from the trajectories captured using the at least one sensor associated with the one or more vehicles.

4. The method of claim 1, further comprising:
generating a driving-scenario simulator based on a plurality of high-quality data captured using one or more high-quality sensors associated with a plurality of autonomous-driving vehicles, and wherein generating the one or more driving simulations is further based on the driving-scenario simulator.

5. The method of claim 1, further comprising:
identifying one or more trajectory features associated with each of the one or more trajectories; and
creating a smooth trajectory that fits the one or more trajectory features for each of the trajectories;
wherein generating the driving simulations is further based on the smooth trajectory for each of the trajectories.

6. The method of claim 5, wherein the one or more trajectory features comprise one or more of:
a waypoint corresponding to a snapshot of an agent in time;
a distance of the trajectory to the agent;
an acceleration associated with the trajectory;
a speed associated with the trajectory;
a comfort feature associated with the trajectory; or
a safety feature associated with the trajectory.

7. The method of claim 5, further comprising:
determining a confidence score for each of the one or more trajectory features;
ranking the one or more trajectory features based on their respective confidence scores; and
selecting one or more top-ranked trajectory features;
wherein creating the smooth trajectory is based on the one or more top-ranked trajectory features.

8. The method of claim 5, further comprising:
generating one or more interpolations between the one or more trajectory features.

9. The method of claim 1, further comprising:
measuring a corresponding parameter value for each of the movement parameters, wherein the parameter distribution for the movement parameters is determined based on the corresponding parameter value.

10. The method of claim 9, further comprising determining a frequency for each parameter value, wherein evaluating the autonomous-driving system comprises a statistical risk computation based on the frequencies for a plurality of parameter values, including evaluating attributes of trajectories generated by the autonomous-driving system to assess a performance of the autonomous-driving system, and wherein the attributes include at least speed, distance to a lane separator, and distance to other vehicles.

11. The method of claim 1, further comprising:
determining a confidence score for each of the trajectories based on a plurality of high-quality data captured using one or more high-quality sensors associated with a plurality of autonomous-driving vehicles; and
selecting one or more of the trajectories based on their respective confidence scores, wherein the selected trajectories each has a confidence score greater than a threshold score;
wherein generating the driving simulations is based on the adjusted parameter distributions associated with the selected trajectories.

12. The method of claim 1, wherein adjusting the parameter distribution for the parameter data associated with the one or more movement parameters is further based on one or more principles associated with the trajectories, and
wherein evaluating the autonomous-driving system includes simulating operation of the ego vehicle and assessing actions of the ego vehicle, including whether the ego vehicle yields on a left turn, an amount of time for the ego vehicle to move through an intersection, and a range of distances to dynamic agents and static objects.

13. A system comprising: one or more processors and one or more computer-readable non-transitory storage media, the one or more computer-readable non-transitory storage media comprising instructions operable when executed by the one or more processors to cause the system to perform operations comprising:
receiving parameter data associated with one or more trajectories captured using at least one sensor associated with one or more vehicles;
determining, based on the one or more trajectories, a parameter distribution associated with one or more movement parameters for the parameter data that indicates variations for performing the one or more trajectories associated with behaviors of different drivers;
adjusting the parameter distribution up to a respective threshold constraint, wherein the respective threshold constraint is based on at least one of the parameter data or the one or more movement parameters for varying driving scenes associated with the one or more trajectories;
generating driving simulations that are based on the adjusted parameter distribution for the parameter data, the driving simulations being computer-generated occurrences of scenarios associated with the adjusted parameters;
evaluating an autonomous-driving system using the driving simulations, wherein evaluating the autonomous-driving system includes analyzing an evaluation result using an active learning strategy to determine modifications to training the autonomous-driving system, including whether to add a test, whether to add training data for a data-driven planner, and how to improve evaluators and reactive agents; and controlling an ego vehicle in an environment according to the autonomous-driving system trained by reactive agents within the driving simulations.

14. The system of claim 13, wherein the parameter data corresponds to one or more first driving scenarios associated with the one or more trajectories captured using the at least one sensor, wherein the adjusted parameter distribution for the parameter data correspond to one or more second driving scenarios associated with the driving simulations, and wherein the second driving scenarios are different from the first driving scenarios.

15. The system of claim 13, wherein generating the driving simulations comprises generating one or more additional trajectories based on the adjusted parameter distribution for the parameter data, and wherein the additional trajectories are different from the trajectories captured using the at least one sensor associated with the one or more vehicles.

16. The system of claim 13, wherein the one or more processors are further operable when executing the instructions to perform operations comprising:
generating a driving-scenario simulator based on a plurality of high-quality data captured using one or more high-quality sensors associated with a plurality of autonomous-driving vehicles, and wherein generating the driving simulations is further based on the driving-scenario simulator.

17. One or more computer-readable non-transitory storage media embodying software that is operable when executed to cause operations comprising:
receiving parameter data associated with one or more trajectories captured using at least one sensor associated with one or more vehicles;
determining, based on the one or more trajectories, a parameter distribution associated with one or more movement parameters for the parameter data that indicates variations for performing the one or more trajectories associated with behaviors of different drivers;
adjusting the parameter distribution up to a respective threshold constraint, wherein the respective threshold constraint is based on at least one of the parameter data or the one or more movement parameters for varying driving scenes associated with the one or more trajectories;
generating driving simulations that are based on the adjusted parameter distribution for the parameter data, the driving simulations being computer-generated occurrences of scenarios associated with the adjusted parameters;
evaluating an autonomous-driving system using the driving simulations, wherein evaluating the autonomous-driving system includes analyzing an evaluation result using an active learning strategy to determine modifications to training the autonomous-driving system, including whether to add a test, whether to add training data for a data-driven planner, and how to improve evaluators and reactive agents; and
controlling an ego vehicle in an environment according to the autonomous-driving system trained by reactive agents within the driving simulations.

18. The one or more computer-readable non-transitory storage media of claim 17, wherein the parameter data corresponds to one or more first driving scenarios associated with the one or more trajectories captured using the at least one sensor, wherein the adjusted parameter distribution for the parameter data correspond to one or more second driving scenarios associated with the driving simulations, and wherein the second driving scenarios are different from the first driving scenarios.

19. The one or more computer-readable non-transitory storage media of claim 17, wherein generating the driving simulations comprises generating one or more additional trajectories based on the adjusted parameter distribution for the parameter data, and wherein the additional trajectories are different from the trajectories captured using the at least one sensor associated with the one or more vehicles.

20. The one or more computer-readable non-transitory storage media of claim 17, further comprising:
generating a driving-scenario simulator based on a plurality of high-quality data captured using one or more high-quality sensors associated with a plurality of autonomous-driving vehicles, and wherein generating the driving simulations is further based on the driving-scenario simulator.

* * * * *